United States Patent [19]

Kobayashi et al.

[11] Patent Number: 4,496,640
[45] Date of Patent: Jan. 29, 1985

[54] BATTERY HAVING ACETYLENE HIGH POLYMER ELECTRODE

[75] Inventors: Yukio Kobayashi, Tokyo; Masaaki Kira, Yokohama; Kinya Yamaguchi, Tokyo, all of Japan

[73] Assignee: Showa Denko Kabushiki Kaisha, Tokyo, Japan

[21] Appl. No.: 531,577

[22] Filed: Sep. 12, 1983

Related U.S. Application Data

[63] Continuation of Ser. No. 339,867, Jan. 18, 1982, abandoned.

[30] Foreign Application Priority Data

| Jan. 22, 1981 | [JP] | Japan | 56-7162 |
| Sep. 1, 1981 | [JP] | Japan | 56-136073 |
| Sep. 2, 1981 | [JP] | Japan | 56-137088 |
| Sep. 2, 1981 | [JP] | Japan | 56-137090 |
| Sep. 8, 1981 | [JP] | Japan | 56-140284 |
| Sep. 28, 1981 | [JP] | Japan | 56-151951 |

[51] Int. Cl.³ .............................. H01M 4/60
[52] U.S. Cl. ........................... 429/213; 429/199; 429/218
[58] Field of Search ............. 429/213, 212, 199, 218

[56] References Cited

U.S. PATENT DOCUMENTS 4,321,114 3/1982 MacDiarmid et al. ......... 429/213 X

OTHER PUBLICATIONS

Berets et al., Trans. Faraday Soc., vol. 64, pp. 823-828 (1968).

Primary Examiner—Charles F. LeFevour
Attorney, Agent, or Firm—McAulay, Fields, Fisher, Goldstein & Nissen

[57] ABSTRACT

An improved battery having anode means, cathode means and an electrolyte is provided, wherein the electrolyte comprises a compound capable of being ionized into at least one dopant selected from anion dopants and cation dopants and at least one of the anode means and cathode means comprises as its electrode-active material an acetylene high polymer having a fibrous microcrystalline (fibril) structure and a bulk density of 0.7 to 1.2 g/cc, which is dopable to a more highly oxidized state by the anion dopant or an electron-accepting compound consisting of the molecule of the anion or dopable to a more lowly oxidized state by the cation dopant or an electron-donating compound consisting of the molecule of the cation.

16 Claims, 3 Drawing Figures

BATTERY HAVING ACETYLENE HIGH POLYMER ELECTRODE

This is a continuation application Ser. No. 339,867 filed Jan. 18, 1982 now abandoned.

BACKGROUND OF THE INVENTION (1) Field of the Invention

The present invention relates to a battery in which at least one of the anode means and the cathode means is formed of an acetylene high polymer having a fibrous microcrystalline (i.e., fibril) structure and a high bulk density and which is characterized in that said battery has a high energy density whereby a longtime discharge is possible, the levelness of the discharge curve is good, the cycle life is good, self-discharge is reduced and reduction of the weight and size can easily be accomplished.

(2) Description of the Prior Art

An acetylene high polymer obtained by polymerizing acetylene in the presence of a so-called Ziegler-Natta catalyst comprising a transition metal compound and an organic metal compound has an electrical conductivity of the semiconductor region, and therefore, it is an organic semiconductor material valuable as an electric or electronic element. However, since the acetylene high polymer prepared according to the above process does not become molten even by heating and since it is readily subject to oxidative deterioration under heating, the polymer cannot be molded according to the customary molding method adopted for ordinary thermoplastic resins. Furthermore, a solvent capable of dissolving therein this acetylene high polymer has not been found. Therefore, molded articles of acetylene high polymers have heretofore been prepared only according to the following two processes.

(A) A powdery acetylene high polymer is compression-molded.

(B) Under specific polymerization conditions, polymerization is carried out to obtain an acetylene high polymer in a film form having a fibrous microcrystalline (fibril) structure and a high mechanical strength (see Japanese patent publication No. 32581/73).

The process (A) is defective in that the molded articles exhibit a low mechanical strength. Although the process (B) is advantageous over the process (A) in that a molded article having a much higher mechanical strength can be prepared, the bulk density of the acetylene high polymer molded article is 0.60 g/cc at the highest (the true density of the acetylene high polymer is 1.20 g/cc) and only a porous film is obtainable according to the process (B).

There also is known a process in which a gel-like acetylene high polymer is freeze-dried and the resulting acetylene high polymer in a foam form is compressed to obtain a compressed porous film having a bulk density of 0.4 g/cm³ (see Polymer Preprints, 20, No. 2, pages 447–451, 1979). The bulk density of the compressed porous film of the acetylene high polymer according to this process is 0.4 g/cm³ at the highest, and this compressed porous film is substantially similar to the acetylene high polymer film prepared according to the process disclosed in Japanese patent publication No. 32581/73.

It is known that when a powdery acetylene high polymer, prepared according to the process (A), is treated with an electron-accepting compound (acceptor) such as $BF_3$, $BCl_3$, $HCl$, $Cl_2$, $SO_2$, $NO_2$, $HCN$, $O_2$ or $NO$, the electrical conductivity is increased 1000 times at the highest and when this acetylene high polymer is treated with an electrondonating compound (donor), the electrical conductivity is reduced to 1/10,000 in an extreme case [see D. J. Berets et al., Trans, Farady Soc., 64, 823 (1968)].

It also is known that when an acetylene high polymer film, obtained according to the process (B) is chemically doped with an electron acceptor such as $I_2$, $Cl_2$, $ICl$, $IBr$, $AsF_5$, $SbF_5$ or $PF_6$, or an electron donor, such as Na, K or Li, the electrical conductivity of the acetylene high polymer film can freely be controlled in a broad range of from $10^{-8}$ to $10^3 \Omega^{-1}\cdot cm^{-1}$ [see J. C. S. Chem. Commu., 578 (1977), Phys. Rev. Lett., 39, 1098(1977), J. Am. Chem. Soc., 100, 1013 (1978) and J. Chem. Phys., 69, 5098 (1978)]. Furthermore, use of this doped acetylene high polymer film as a material of a cathode of a primary battery has already been proposed [see Molecular Metals, NATO Conference Series, Series VI, 471–489 (1978)].

In addition to the above-mentioned chemically doping process, there has already been developed an electrochemically doping process in which an acetylene high polymer is electrochemically doped with an anion dopant, such as $ClO_4^-$, $PF_6^-$, $AsF_6^-$, $AsF_4^-$, $CF_3SO_3^-$ or $BF_4^-$, and a cation dopant, such as $R'_4N^+$ (in which R' stands for an alkyl group), to obtain electrically conductive acetylene high polymers of the p-type and n-type [see J. C. S. Chem. Commu., 1979, 594. C & EN, Jan., 26, 39 (1981) and J. C. S. Chem. Commu., 1981, 317]. Furthermore, a re-chargeable secondary battery, utilizing electrochemical doping of a acetylene high polymer film prepared according to the process (B) has been reported [see Paper Presented at the International Conference on Low Dimensional Synthetic Metals, Hersinger, Denmark, 10–15, August, 1980]. This battery comprises as the cathode and the anode, two acetylene high polymer films prepared according to the process (B), and when these electrodes are immersed in a solution of lithium iodide in tetrahydrofuran and are connected to a 9-V direct current source, lithium iodide is electrolyzed to dope the acetylene high polymer of the cathode with iodine cations and the acetylene high polymer of the anode with lithium anions. This electrolytic doping corresponds to the charging step. When the two doped electrodes are connected to a load, the lithium ion reacts with the iodine ion to generate electric power. It is reported that in this rechargable secondary battery, the open circuit voltage (Voc) is 2.8 V and the short circuit current density is 5 mA/cm². When a solution of lithium perchlorate in tetrahydrofuran is used, the open circuit voltage is 2.5 V and the short circuit current density is about 3 mA/cm².

In this rechargable secondary battery, an acetylene high polymer, allowing reduction of the weight and size of the electrodes, is used as the electrode material. Accordingly, this battery, which is attractive as a rechargable secondary battery, has a high energy density, can easily be reduced in weight and size, and can be manufactured at a low cost. However, since the acetylene high polymer, used as the electrode in such known battery, is an acetylene high polymer in the form of a porous film having a low bulk density, which is prepared according to the above-mentioned process (B), this battery is inevitably defective in the following points.

(i) The short circuit current (Isc) is reduced to zero within a very short time (within about 3 minutes) at the time of discharge. Namely, the discharge time is very short.

(ii) Since the amount of the dopant doped is 6 mole % at the highest, based on the recurring unit CH of the acetylene high polymer constituting the electrode, the energy density or discharge capacity is limited.

(iii) The levelness of the discharge curve is poor.

(iv) The deterioration of the acetylene high polymer is advanced by repetition of the charging and the discharging, and no economically satisfactory cycle life can be obtained.

(v) The self-discharge is prominent.

Accordingly, the uses of such a battery, in which the electrode material is comprised of an acetylene high polymer in the form of a porous film prepared according to the process (B), is considerably limited. Therefore, development of a cheap battery which ensures a long-time discharge with a high energy density or discharge capacity, a good levelness of the discharge curve, a good cycle life with reduced self-discharge and in which the weight and size can easily be reduced, has been desired in the art.

SUMMARY OF THE INVENTION

It is a primary object of the present invention to provide a battery which ensures a long-time discharge with a high energy density, a good levelness in the discharge curve (i.e., the curve showing the dependence of the voltage upon the discharge time), a good cycle life and in which the weight and size can easily be reduced and which is cheap.

Other objects and advantages of the present invention will become apparent from the following description.

In accordance with the present invention, there is provided a battery comprising anode means, cathode means and an electrolyte, wherein the electrolyte comprises a compound capable of being ionized into at least one dopant selected from the group consisting of anion dopants and cation dopants and at least one of said anode means and cathode means comprises, as its electrode-active material, an acetylene high polymer having a fibrous microcrystalline (fibril) structure and a bulk density of 0.7 to 1.2 g/cc, which is dopable to a more highly oxidized state by said anion dopant or an electron-accepting compound consisting of the molecule of said anion, or dopable to a more lowly oxidized state by said cation dopant or an electron-donating compound consisting of the molecule of said cation.

DETAILED DESCRIPTION OF THE PREFERRED EMBODIMENTS

Figure 1:
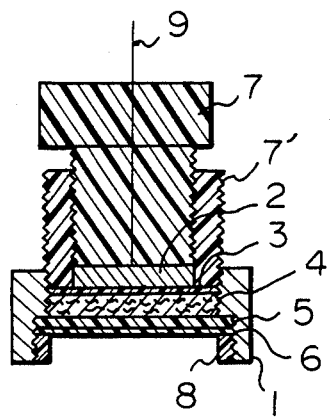
FIG. 1 is a sectional diagram illustrating an electrolytic cell for measuring the characteristics of a button type primary battery according to one embodiment of the present invention.

In the present invention, an acetylene high polymer having a fibrous microcrystalline (fibril) structure and a bulk density of 0.7 to 1.2 g/cc, or an electrically conductive acetylene high polymer obtained by doping said acetylene high polymer with a dopant, is used as an electrode material. The battery of the present invention is advantageous in various points over a conventional battery prepared by using, as an electrode material, a conventional porous acetylene high polymer having a low bulk density or an electrically conductive porous acetylene high polymer. For example, the energy density is increased, the discharge time is prolonged, the levelness of the discharge curve and the cycle life are highly improved, and the self-discharge is reduced. It has not clearly been elucidated why such advantages can be attained in the present invention, but it is believed that, when an acetylene high polymer or electrically conductive acetylene high polymer having a high density, included within the above-mentioned range, is used as an electrode material, the capacity of the electrode is promoted by the bulk density of the acetylene high polymer used as the electrode material and the above-mentioned advantages of the present invention can be attained.

In other words, it has been found that an acetylene high polymer having a bulk density of at least 0.7 g/cc, or an electrically conductive acetylene high polymer obtained by doping said acetylene high polymer with a dopant, is essentially different from an acetylene high polymer having a bulk density lower than 0.7 g/cc, or an electrically conductive acetylene high polymer obtained by doping said acetylene high polymer with a dopant, and the present invention has been completed based on this finding.

More specifically, the bulk density of the acetylene high polymer has a close relation to the electric conductivity of the acetylene high polymer, or the dopant-doped acetylene high polymer, and in the case of an acetylene high polymer having a bulk density lower than 0.7 g/cc, the electrical conductivity of the acetylene high polymer, or doped acetylene high polymer, is increased in direct proportion to the bulk density, while in the case of an acetylene high polymer having a bulk density of at least 0.7 g/cc, the rate of increase in the electrical conductivity is much higher than the rate of increase in the bulk density. This fact proves that the mechanism of electrical conduction in an acetylene high polymer having a bulk density of at least 0.7 g/cc, or an electrically conductive acetylene high polymer obtained by doping said acetylene high polymer with a dopant, is essentially different from the mechanism of electrical conduction in an acetylene high polymer having a bulk density lower than 0.7 g/cc, or an electrically conductive acetylene high polymer obtained by doping said acetylene high polymer with a dopant.

That is to say, in case of an acetylene high polymer having a bulk density of at least 0.7 g/cc, or an electrically conductive acetylene high polymer obtained by doping said acetylene high polymer with a dopant, the interaction between fibrils or macromolecules plays an important role in order to increase the electrical conductivity of the acetylene high polymer.

The bulk density of the acetylene high polymer having a fibrous microcrystalline (fibril) structure, used in the present invention, is 0.7 to 1.2 g/cc, preferably 0.8 to 1.2 g/cc, more preferably 0.9 to 1.2 g/cc.

This acetylene high polymer having a fibrous microcrystalline (fibril) structure and a bulk density of 0.7 to 1.2 g/cc, used in the present invention, may be prepared according to processes proposed in Japanese Laid-Open patent application Nos. 129,404/80, 128,419/80, 142,030/80, 145,710/80 and 145,711/80 and Japanese patent application Nos. 83,929/79 and 34,687/80, though applicable preparation processes are not limited to these processes. This acetylene high polymer may be either a non-oriented polymer or a polymer drawn to be thereby oriented according to a known process [see Polym. Preprint, Japan, 27, No. 9, 1780 (1978)]. It is preferred that the number average molecular weight of the acetylene high polymer be in the range of from about 1,000 to about 100,000. The acetylene high polymer is infusible and insoluble and it is difficult to directly determine the molecular weight of the acetylene high polymer. Accordingly, the number average molecular weight referred to herein is a value calculated from the number average molecular weight measured with respect to polyethylene formed by hydrogenating the acetylene high polymer. This measurement method is disclosed in Macromolecules, 13, 457 (1980).

The acetylene high polymer prepared according to the above-mentioned process has advantageous characteristics of synthetic polymers, such as being light in weight and having good productivity, processability, film-forming property and flexibility; therefore, it is suitable as an electrode material in any primary or secondary battery having a small size, a light weight and a high energy density.

In the present invention, any of a cis-rich acetylene high polymer, a trans-rich acetylene high polymer and a cis-trans mixed acetylene high polymer can be used. The area and thickness of the acetylene high polymer used as the electrode are not particularly critical, and an acetylene high polymer having an optional area and thickness may be used in the present invention.

Doping of the acetylene high polymer with a dopant can be accomplished by either a chemically doping method or an electrochemically doping method.

As the dopant used for chemically doping the acetylene high polymer, there can be used various known electron-accepting and electron-donating compounds, for example, (1) halogens, such as iodine, bromine and bromine iodide; (2) metal halides, such as arsenic pentafluoride, antimony pentafluoride, silicon tetrafluoride, phosphorus pentachloride, phosphorus pentafluoride, aluminum chloride, aluminum bromide and aluminum fluroride, (3) protonic acids, such as sulfuric acid, nitric acid, fluorosulfuric acid, trifluoromethane-sulfuric acid and chlorosulfuric acid; (4) oxidants, such as sulfur trioxide, nitrogen dioxide and difluorosulfonyl peroxide; (5) $AgClO_4$; (6) tetracyanoethylene, tetracyanoquinodimethane, chloranil, 2,3-dichloro-5,6-dicyanoparabenzoquinone and 2,3-dibromo-5,6-dicyanoparabenzoquinone; and (7) alkali metals, such as sodium, potassium and lithium.

As the dopant used for electrochemically doping the acetylene high polymer, there can be mentioned (1) anion dopants, for example, halide anions of elements of the group VA in the Periodic Table, such as $PF_6^-$, $SbF_6^-$, $AsF_6^-$, $SiF_6^{--}$ and $SbCl_6^-$, halide anions of elements of the group IIIA in the Periodic Table, such as $BF_4^-$, $BCl_4^-$ and $AlCl_4^-$, halogen anions, such as $I^-$ ($I_3^-$), $Br^-$ and $Cl^-$, perhalo-acid anions, such as $ClO_4^-$ and $IO_4^-$, and an organic anion such as $CF_3SO_3^-$, $C_6H_5SO_3^-$, $CF_3COO^-$, $CH_3C_6H_4SO_3^-$, $C_6H_5CO_2^-$ and $CH_3CO_2^-$, (each is effective as a dopant providing a p-type electrically conductive acetylene high polymer), and (2) cation dopants, for example, alkali metal ions such as $Li^+$, $Na^+$ and $K^+$ and an organic cation selected from the group consisting of $R_{4-x}MH_x^+$ and $R_3E^+$, wherein R is alkyl or aryl, M is N, P or As, E is O or S, and X is an integer ranging from 0 to 4 (each is effective as a dopant providing an n-type electrically conductive acetylene high polymer). The dopants that can be used in the present invention are not limited to those exemplified above.

As specific examples of compounds providing the abovementioned anion and cation dopants, there can be mentioned $LiPF_6$, $LiSbF_6$, $LiAsF_6$, $LiClO_4$, $NaI$, $NaPF_6$, $NaSbF_6$, $NaAsF_6$, $NaClO_4$, $KI$, $KPF_6$, $KSbF_6$, $KAsF_6$, $KClO_4$, $[(n-Bu)_4N]^+ \cdot (AsF_6)^-$, $[(-Bu)_4N]^+ \cdot (PF_6)^-$, $[(n-Bu)_4N]^+ \cdot ClO_4^-$, $LiAlCl_4$ and $LiBF_4$. Of course, compounds that can be used in the present invention are not limited to those exemplified above. These compounds may be used either alone or in combination.

The $HF_2^-$ anion is especially preferred as the anion dopant, and an especially preferred cation dopant is a pyrylium or pyridinium cation represented by the following formula (I):

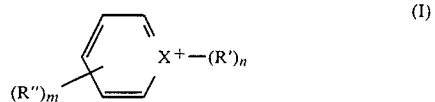

wherein X stands for an oxygen or nitrogen atom, R' stands for a hydrogen atom, an alkyl group having 1 to 20 carbon atoms or an aryl group having 6 to 20 carbon atoms, R" stands for a halogen atom, an alkyl group having 1 to 10 carbon atoms or an aryl group having 6 to 20 carbon atoms, and n is 0 when X is an oxygen atom or n is 1 when X is a nitrogen atom, and m is an integer of from 0 to 5, or a carbonium cation represented by the following formula (II) or (III):

or

wherein $R^1$, $R^2$ and $R^3$ stand for a hydrogen atom, an alkyl group having 1 to 15 carbon atoms, an allyl group, an aryl group having 6 to 20 carbon atoms or a group $-OR^5$ in which $R^5$ stands for an alkyl group having 1 to 10 carbon atoms or an aryl group having 6 to 20 carbon atoms, with the proviso that the case where all of $R^1$, $R^2$ and $R^3$ are hydrogen atoms is excluded, and $R^4$ stands for a hydrogen atom, an alkyl group having 1 to 15 carbon atoms or an aryl group having 6 to 20 carbon atoms.

The above-mentioned $HF_2^-$ anion, pyrylium or pyridinium cation represented by the formula (I) or carbonium cation represented by the formula (II) or (III) can be doped in a large quantity in the acetylene high polymer, and therefore, a battery having a large discharge capacity and a high energy density can be obtained.

The $HF_2^-$ anion is ordinarily obtained by dissolving as a supporting electrolyte a compound (hydrogen fluoride salt) represented by the following formula (IV), (V) or (VI):

$R'_4N \cdot HF_2$     (IV),

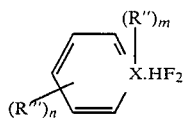

or

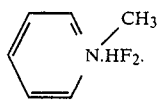

wherein R' and R" stands for a hydrogen atom, an alkyl group having 1 to 15 carbon atoms or an aryl group having 6 to 20 carbon atoms, R''' stands for an alkyl group having 1 to 10 carbon atoms or an aryl group having 6 to 20 carbon atoms, X is an oxygen or nitrogen atom, m is 0 when X is an oxygen atom or m is 1 when X is a nitrogen atom, n is an integer of from 0 to 5 and M stands for an alkali metal, in an appropriate organic solvent. As specific examples of the compounds represented by the formulae (IV), (V) and (VI), there can be mentioned $H_4N \cdot HF_2$, $(n\text{-}Bu)_4 N \cdot HF_2$, $Na \cdot HF_2$, $K \cdot HF_2$, $Li \cdot HF_2$ and The pyrylium or pyridinium cation represented by the formula (I) may be obtained by dissolving as a supporting electrolyte a salt of the cation of the formula (I) with an anion such as $ClO_4^-$, $BF_4^-$, $AlCl_4^-$, $FeCl_4^-$, $SnCl_5$, $PF_6^-$, $PCl_6^-$, $SbF_6^-$, $AsF_6^-$, $CF_3SO_3^-$ or $HF_2^-$ in an appropriate organic solvent. As specific examples of such a salt, the following compounds can be mentioned:

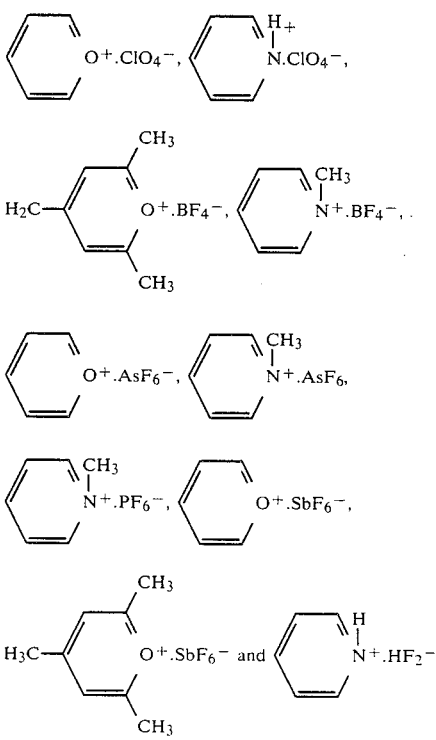

As specific examples of the carbonium cation represented by the above formula (II) or (III), there can be mentioned $(C_6H_5)_3C^+$, $(CH_3)_3C^+$,

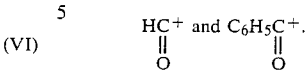

These carbonium cations may be obtained by dissolving as a supporting electrolyte a salt (carbonium salt) of the carbonium cation with an anion in an appropriate organic solvent. As typical instances of the anion, there can be mentioned $BF_4^-$, $AlCl_4^-$, $AlBr_3Cl^-$, $FeCl_4^-$, $SnCl_5^-$, $PF_6^-$, $PCl_6^-$, $SbCl_6^-$, $SbF_6^-$, $AsF_6^-$, $ClO_4^-$ and $CF_3SO_3^-$. As specific examples of the carbonium salt, there can be mentioned $(C_6H_5)_3C \cdot BF_4$, $(CH_3)_3C \cdot BF_4$, $HCO \cdot AlCl_4$, $HCO \cdot BF_4$ and $C_6H_5CO \cdot SnCl_5$.

The amount of the dopant, which is doped in advance or at the time of charging into the acetylene high polymer, is in the range of from 2 to 40 mole %, preferably 4 to 30 mole %, especially preferably 4 to 20 mole %, based on the recurring unit CH in the acetylene high polymer. If the amount of the dopant is smaller than 2 mole % or larger than 40 mole %, a battery having a sufficiently large discharge capacity or energy density cannot be obtained.

The electrical conductivity of the acetylene high polymer before doping is about $10^{-8}$ to about $10^{-9} \Omega^{-1} \cdot cm^{-1}$ for a cis-polymer and about $10^{-5} \Omega^{-1} \cdot cm^{-1}$ for a trans-polymer but the electrical conductivity of the electrically conductive acetylene high polymer obtained by doping the acetylene high polymer with a dopant is in the range of about $10^{-9}$ to $10^{-4} \Omega^{-1} \cdot cm^{-1}$. When an acetylene high polymer is used as an electrode of a primary battery, it is ordinarily preferred that the acetylene high polymer be doped in advance, to an extent such that the electrical conductivity of the doped acetylene high polymer is higher than about $10^{-4} \Omega^{-1} \cdot cm^{-1}$. In this invention, both doped and undoped acetylene high polymers can be used as an electrode of a secondary battery. When the doped acetylene high polymer is used as an electrode of a secondary battery, the electrical conductivity may be in the range of from about $10^{-9}$ to about $10^{-4} \Omega^{-1} \cdot cm^{-1}$ or higher than about $10^{-4} \Omega^{-1} \cdot cm^{-1}$.

The process for doping the acetylene high polymer with a dopant is not particularly critical. Both chemically doping methods and electrochemically doping methods can be used and there may be adopted known processes [see, for example, J. C. S. Chem. Commu., 578(1977), Phys. Rev. Lett., 39, 1098(1977), J. Am. Chem. Soc., 100, 1013(1978), J. C. S. Chem. Comm., 594 (1979) and J. Electroanal. Chem., 111, 115 (1980)].

Ordinarily, for doping the acetylene high polymer with the $HF_2^-$ anion, there may be adopted a process in which a hydrogen fluoride salt as the supporting electrolyte, is dissolved in an organic solvent, having a non-protonic property and a high dielectric constant, to form an electrolyte solution and applying an appropriate direct current voltage such that the acetylene high polymer acts as the anode, for example, a direct current voltage of higher than 0.8 V. For doping the acetylene polymer with a pyrylium or pyridinium cation, represented by the above formula (I), or a carbonium ion, represented by the above formula (II) or (III), there may be adopted a process in which a pyrylium or pyridinium salt or a carbonium salt, as the supporting electrolyte is dissolved in a non-protonic organic solvent, having a high dielectric constant, to form an electrolyte solution and applying an appropriate direct current voltage, such that the acetylene high polymer acts as the cathode, for example, a direct current voltage of higher than 0.8 V.

The amount of the dopant doped can freely be controlled by controlling the quantity of the electric charge flowing upon electrolysis. Doping may be carried out under constant current conditions, constant voltage conditions or conditions where both the current and the voltage are changed. The current value, the voltage value and the doping time adopted for the doping operation, may be varied, depending upon the bulk density and area of the acetylene high polymer used, the kind of the dopant, the kind of the electrolyte solution and the required electric conductivity of the electrically conductive acetylene high polymer.

In the present invention, an aqueous solution or a non-aqueous solution may be used as the electrolyte solution, but a solution, formed by dissolving the dopant in a non-aqueous organic solvent, is preferably used. Furthermore, a pasty electrolyte, comprising a supporting electrolyte and a small amount of an organic solvent, or a solid electrolyte may be used in the present invention. A non-protonic organic solvent having a high dielectric constant is preferably used as the organic solvent. Examples of preferable non-protonic organic solvents are ethers, ketones, nitriles, amines, amides, sulfur compounds, chlorinated hydrocarbons, esters, carbonates and nitro compounds. Among these solvents, ethers, ketones, nitriles, chlorinated hydrocarbons and carbonates are especially preferred. As typical instances, there can be mentioned tetrahydrofuran, 2-methyltetrahydrofuran, 1,4-dioxane, monoglime, acetonitrile, propionitrile, 4-methyl-2-pentanon, butyronitrile, 1,2-dichloroethane, γ-butyrolaclone, dimethoxyethane, methyl formate, propylene carbonate, ethylene carbonate, dimethylformamide, dimethylsulfoxide, dimethylthioformamide and sulforane. Of course, solvents that can be used in the present invention are not limited to those exemplified above. These organic solvents may be used either alone or in combination. According to the type of the battery or the kind of the electrode, the presence of oxygen or water or a protonic solvent in such solvents results in reduction of the characteristics of the battery. In this case, it is preferred that the solvent used be purified according to customary procedures.

The concentration of the electrolyte used in the present invention may be varied, depending on the particular cathode or anode used, the charging and discharging conditions, the operation temperature, the kind of the electrolyte and the kind of the organic solvent, and it is difficult to generally define the concentration of the electrolyte. Ordinarily, however, the concentration of the electrolyte is in the range of from 0.001 to 10 mole/l.

The acetylene high polymer having a fibrous microcrystalline (fibril) structure and a bulk density of 0.7 to 1.2 g/cc or the electrically conductive acetylene high polymer, obtained by doping said acetylene high polymer with a dopant, that is used in the present invention, may be used as (i) a cathode-active material for a primary or secondary battery, (ii) an anode-active material for a primary or secondary battery or (iii) a substance for activating a cathode and an anode for a primary or secondary battery.

In the case where the acetylene high polymer having a fibrous microcrystalline (fibril) structure and a bulk density of 0.7 to 1.2 g/cc, or the electrically conductive acetylene high polymer obtained by doping said acetylene high polymer with a dopant is used as a cathode-active material in a secondary battery, according to the present invention, as the negative electrode there may be used (a) metals having a Pauling electronegativity value not exceeding 1.6, for example, alkali metals (such as lithium and sodium), aluminum and magnesium; (b) intercalation compounds such as $TiS_2$, $WO_3$, $V_2O_5$, $NbS_3$, $MoO_3$, $NbSe_3$, $NbSe_4$ and $MoO_2$; or (c) $\pi$-conjugated polymers, such as polyphenylene, poly(2,5)thienylene and polypyrrole. However, usable electrode-active materials are not limited to those exemplified above.

As specific examples of the structure of the secondary battery comprising the acetylene high polymer, or electrically conductive acetylene high polymer, as the cathode-active material (i), there can be mentioned $(CH)_x$ (cathode)/$LiClO_4$ (electrolyte)/Li (anode), $[(CH)^{+0.10}(ClO_4)_{0.10}^-]_x$ (cathode)/$LiClO_4$ (electrolyte)/Li (anode). Incidentally, $(CH)_x$ represents the acetylene high polymer (the same will apply hereinafter).

As specific examples of the structure of the secondary battery comprising the acetylene high polymer or electrically conductive acetylene high polymer as the material (iii) for activating both the cathode and anode, there can be mentioned $(CH)_x$ (cathode)/$LiClO_4$ (electrolyte)/ $(CH)_x$ (anode), $(CH)_x$ (cathode)/$Bu_4N.BF_4$ (electrolyte)/$(CH)_x$ (anode), $(CH)_x$ (cathode)/$Bu_4N.AsF_6$ (electrolyte)/$(CH)_x$ (anode), $(CH)_x$ (cathode)/$Na.HF_2$ (electrolyte)/$(CH)_x$ (anode), $(CH)_x$ (cathode)/

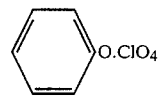

(electrolyte)/$(CH)_x$ (anode), $(CH)_x$ (cathode)/

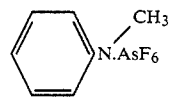

(electrolyte)/$(CH)_x$ (anode), $(CH)_x$ (cathode)/ $(C_6H_5)_3C.BF_4$ (electrolyte)/$(CH)_x$ (anode), $(CH)_x$ (cathode)/

(electrolyte)/$(CH)_x$ (anode), $[(CH)^{+0.08}(ClO_4)_{0.08}^-]_x$ (cathode)/$(n-Bu_4N^+).(ClO_4)^-$(electrolyte)/ $[(n-Bu_4N)_{0.08}{}^+(CH)^{-0.08}]_x$ (anode), $[(CH)^{+0.10}PF_6)_{0.10}^-]_x$ (cathode)/$n-Bu_4N)^+.(PF_6)^-$(electrolyte)/ $[(n-Bu_4N)_{0.10}{}^+(CH)^{-0.10}]_x$ (anode), $[(CH^{+0.050}(ClO_4)_{0.050}^-]_x$ (cathode)/$(n-Bu_4N)^+.(ClO_4)^-$(electrolyte)/ $[(CH)^{+0.020}(ClO_4)_{0.020}^-]_x$ (anode), $[(n-Bu_4N)_{0.02}{}^+(CH)^{-0.02}]_x$ (cathode)/$(n-Bu_4N)^+.(ClO_4)^-$(electrolyte)/ $[(n-Bu_4N)_{0.07}{}^+(CH)^{-0.07}]_x$ (anode) and $[(CH)^{+0.010}(I_3)_{0.010}^-]_x$ (cathode)/NaI (electrolyte)/$[(CH)^{-0.010}(Na)_{0.010}{}^+]_x$ (anode).

However, applicable structures are not limited to those exemplified above.

When the acetylene high polymer having a fibrous microcrystalline (fibril) structure and a bulk density of 0.7 to 1.2 g/cc is used as the cathode or anode or both the cathode and anode in a primary battery, the acetylene high polymer should be doped in advance with a dopant, so that the electric conductivity of the doped polymer is at least $10^{-4}\Omega^{-1}.cm^{-1}$, preferably at least $10^{-2}\Omega^{-1}.cm^{-1}$ and more preferably at least $0.1\ \Omega^{-1}.cm^{-1}$.

When such electrically conductive acetylene high polymer is used as a cathode-active material in a primary battery, as the anode-active material, there can be used metals having a Pauling electronegativity value not exceeding 1.6, for example, alkali metals, such as lithium and sodium, aluminum and magnesium; intercalation compounds such as $TiS_2$, $WO_3$, $V_2O_5$, $NbS_3$, $MoO_3$, $NbSe_3$, $NbSe_4$ and $MoO_2$, which have been doped with an alkali metal or the like; and $\pi$-conjugated polymers such as polyphenylene, poly(2,5)thienylene and polypyrrole, which have been doped with an alkali metal or the like. However, applicable materials are not limited to those exemplified.

As specific examples of the structure of the primary battery comprising the electrically conductive acetylene high polymer as the substance for activating both the cathode and anode, there can be mentioned structures exemplified above with respect to the secondary battery (iii).

In the present invention, a light metal may be used in the form of a sheet, as in the case of an ordinary lithium battery, or such a sheet may be compression-bonded to a wire net of nickel or stainless steel.

In the present invention, the electrolyte salt, as the supporting electrolyte of a primary or secondary battery may be used in the form of a solid electrolyte, for example, in the finely divided state, but is preferably employed in the form of an electrolyte solution or suspension in a suitable solvent which is inert, with respect to the electrode materials, and which will permit the migration of the electrolyte ions to and from the electrode-active materials (for example, propylene carbonate, an ether, such as monoglyme, diglyme or solid oxidized polyethylene, or a cyclic ether, such as tetrahydrofuran or dioxane). Since the electrolyte preferably includes only a minimal amount of a solvent to facilitate ionic mobility, a particularly suitable form of the electrolyte is a suspension of the electrolyte salt in its saturated solution, e.g., a paste.

The electrolyte is preferably impregnated within a solid matrix in the internal circuit of the battery structure. Such a solid matrix may comprise one or both of the electrode-active doped acetylene high polymers and/or an inert porous medium permeable to the electrolyte and separating the two electrode-active materials, such as, for example, filter paper, glass frit, porous ceramic, the acetylene high polymer in undoped form, or the like. When impregnated within the electrode-active doped acetylene high polymer, the electrolyte further serves as an ionic conductor which fills the voids in whole or in part between particles or fibers of the acetylene high polymer. The impregnation may be effected by wetting the matrix material with a concentrated, e.g., saturated, solution or suspension of the electrolyte salt in a suitable inert solvent, as described above. While the solvent may subsequently be volatilized, for example, under vacuum, to leave the electrolyte salt impregnated within the matrix as a solid electrolyte, it has been found preferable to maintain a minimal amount of solvent present in the impregnated matrix in order to facilitate ionic mobility.

It is preferred that the electrolyte should be present in the internal circuit of the battery structure in excess of the amount required for the electrochemical doping reaction at charging and/or discharging of the battery system.

In the present invention, a porous membrane of a synthetic resin, such as polyethylene or polypropylene, or natural fiber paper may be used as a separator, if necessary.

The acetylene high polymer used in the present invention gradually undergoes oxidation by oxygen and the capacity of the battery is gradually reduced. Therefore, it is indispensable that the battery should be of the sealed type and kept in a substantially oxygen-free state.

The battery comprising an electrode of an acetylene high polymer having a fibrous microcrystalline (fibril) structure and a bulk density of 0.7 to 1.2 g/cc or an electrically conductive acetylene high polymer obtained by doping said acetylene high polymer with a dopant according to the present invention, is advantageous over a conventional battery comprising an acetylene high polymer having a low bulk density. For example, the battery according to the present invention has a higher energy density, a better levelness of the discharge curve and a better cycle life, and in the battery according to the present invention, long-time discharging is possible and the self-discharge is minimized. Moreover, in the battery according to the present invention, the discharging characteristics can be changed by changing the bulk density of the acetylene high polymer.

Since the battery according to the present invention has a light weight and small size and has a high energy density, it can suitably be used as a primary or secondary battery for portable machines or instruments or as a secondary battery for electric car or gasoline cars or for power storage.

The present invention will now be described in detail with reference to the following Examples that, however, by no means limit the scope of the invention. In these Examples, the fabrication of batteries was carried out in an argon atmosphere.

EXAMPLE 1

[Preparation of an Acetylene High Polymer Having a High Bulk Density]

A catalyst solution was prepared by charging in sequence at room temperature 200 ml of toluene purified according to customary procedures as a polymerization solvent, 2.94 millimoles of tetrabutoxy titanium as one catalyst component and 7.34 millimoles of triethyl aluminum as the other catalyst component in a one liter capacity glass reaction vessel, the inside atmosphere of which was previously completely substituted by nitrogen gas. This catalyst solution was homogeneous. Then, the reaction vessel was cooled by liquefied nitrogen and the nitrogen gas in the reaction vessel was removed by a vacuum pump. The reaction vessel was cooled to $-78°$ C., and, while the catalyst solution was kept stationary, purified acetylene gas maintained at one atmosphere was blown into the reaction vessel. At the initial stage of polymerization, the reaction mixture became a gel. The polymerization reaction was continued in this state while maintaining the acetylene gas pressure at one atmosphere. The reaction product had a reddish violet color and was in a gel-like state. Unreacted acetylene gas was removed after completion of the polymerization reaction. The reaction-product was washed with 200 ml of purified toluene 4 times, while maintaining the temperature at $-78°$ C., to obtain a toluene-swollen acetylene high polymer in a sheet form having a thickness of about 0.5 cm. In this swollen acetylene high polymer, fibrous microcrystals (fibrils) having a size of 300 to 500 Å were regularly entangled with one another, and a powdery or bulky polymer was not formed at all.

The sheet-like swollen acetylene high polymer was inserted between two chromium-plated ferrotype stainless steel plates and pre-pressed at room temperature under a pressure of 100 Kg/cm$^2$, and it was then pressed under a pressure of 15 ton/cm$^2$ to obtain a uniform flexible acetylene high polymer film having a reddish brown metallic luster and a thickness of 120 $\mu$m. The film was dried in vacuo at room temperature for 5 hours. The bulk density of the obtained acetylene high polymer film was 1.05 g/cc, and when the film was examined by an electron microscope, it was confirmed that the film was non-porous. This acetylene high polymer film had a cis content of 90% and was a p-type semiconductor having an electrical conductivity of $4.8 - 10^7 \Omega^{-}.cm^{-1}$, as determined by the direct-current four-terminal method at 20° C.

[Doping Test]

A small specimen, having a width of 0.5 cm and a length of 2.0 cm, was prepared from the so-obtained acetylene high polymer film having a thickness of 120 $\mu$m and a bulk density of 1.05 g/cc and was mechanically press-bonded to a platinum wire and used as a cathode. Metallic lithium was used as an anode and a propylene carbonate solution containing 0.3 mole/l of LiClO$_4$ was used as an electrolyte solution. Doping was carried out under a constant electric current (0.08 mA) for 18 hours. After completion of the doping operation, the doped acetylene high polymer film was washed with propylene carbonate. The doped acetylene high polymer film had a golden metallic luster and, by the elementary analysis, the film was found to have a composition of $[CH(ClO_4)_{0.060}]_x$. This film was a p-type semiconductor having an electrical conductivity of 880 $\Omega^{-1}.cm^{-1}$, as determined by the direct-current four-terminal method.

[Discharge Test of Battery]

The doped acetylene high polymer film, $[CH(ClO_4)_{0.060}]_{x'}$, obtained according to the above-mentioned method, was mechanically press-bonded to a platinum wire and used as a cathode, and metallic lithium was used as an anode. The discharge test was thus carried out by using a propylene carbonate solution containing 0.3 mole/l of LiClO$_4$ as an electrolyte solution. The short circuit current (Isc) and open-circuit voltage (Voc) were measured at predetermined intervals. The obtained results are shown in Table 1.

TABLE 1

| Discharge Time (minutes) | Isc (mA) | Voc (V) |
|---|---|---|
| 0 | 12.5 | 3.80 |
| 1 | 12.0 | 3.79 |
| 2 | 11.5 | 3.81 |
| 3 | 10.9 | 3.82 |
| 4 | 10.2 | 3.79 |
| 5 | 9.8 | 3.68 |
| 10 | 7.1 | 3.55 |
| 20 | 5.3 | 3.56 |
| 30 | 3.7 | 3.49 |
| 60 | 2.5 | 3.57 |

[Repeated Charging-Discharging Test of a Battery]

A small specimen having a width of 0.5 cm and a length of 2.0 cm was prepared from an acetylene high polymer having a thickness of 120 $\mu$m and a bulk density of 1.05 g/cc, which was obtained according to the above-mentioned method, and the specimen was mechanically press-bonded to a platinum wire and used as a cathode. Metallic lithium was used as an anode and metallic lithium was also used as a reference electrode, and a propylene carbonate solution containing 1.0 mole/l of LiClO$_4$ was used as an electrolyte solution. Charging was carried out under a constant electric current density (0.5 mA/cm$^2$) for 5 hours (the quantity of electric charge corresponding to a doping quantity of 9 mole %). Just after completion of the charging, discharging was carried out under a constant electric current density (0.5 mA/cm$^2$). When the voltage became 1 V, discharging was stopped and charging was carried out again under the above-mentioned conditions. Thus, charging and discharging were repeated 500 times. The discharge voltage characteristics were not changed at all after this repeated charging-discharging test.

The energy density was 620 W. hr per Kg of the used acetylene high polymer and the charging-discharging efficiency was 93%. The ratio of the quantity of the electric charge discharged until the voltage was reduced to 3 V to the total quantity of the electric charge discharged was 91%.

EXAMPLE 2

The repeated charging-discharging test was repeated 400 times in the same manner as described in Example 1 except that LiAsF$_6$ was used as the supporting electrolyte instead of LiClO$_4$ used in Example 1, and the doping time was changed to 10 hours (the quantity of electric charge corresponding to a doping quantity of 18 mole %). The discharge voltage characteristics were not changed at all even after this repeated charging-discharging test.

The energy density was 1,150 W. hr per Kg of the used acetylene high polymer, and the charging-discharging efficiency was 86%. The ratio of the quantity of the electric charge discharged until the voltage was reduced to 3 V to the total quantity of the electric charge discharged was 90%.

COMPARATIVE EXAMPLE 1

[Preparation of an Acetylene High Polymer]

In a nitrogen atmosphere, 5.1 ml (15.0 millimoles) of titanium tetrabutoxide was charged into a 500-ml inner volume glass reaction vessel, and titanium tetrabutoxide was dissolved in 20.0 ml of toluene and 5.4 ml (40 millimoles) of triethyl aluminum was added to the solution with stirring to effect a reaction thereby obtaining a catalyst solution.

The reaction vessel was cooled by liquefied nitrogen, the nitrogen gas in the reaction vessel was removed by a vacuum pump, and the reaction vessel was cooled to −78° C.

The reaction vessel was rotated to cause the catalyst solution to adhere uniformly to the inner wall of the reaction vessel, and while the reaction vessel was kept in the stationary state, purified acetylene gas, maintained at one atmosphere, was immediately introduced in the reaction vessel to initiate polymerization. Simultaneously with the initiation of polymerization, an acetylene high polymer having a metallic luster was precipitated on the inner wall of the reaction vessel. The polymerization reaction was conducted at −78° C. while maintaining the acetylene pressure at one atmosphere. Unreacted acetylene was removed by a vacuum pump and the polymerization reaction was stopped. In a nitrogen atmosphere, the remaining catalyst solution was removed by an injector. The polymerization product was washed with purified toluene 6 times while maintaining the temperature at −78° C. and the polymerization product was then dried in vacuo at room temperature. An acetylene high polymer film, having a thickness of 90 μm and a cis content of 98%, was formed only on the area where the catalyst solution adhered to the inner wall of the reaction vessel. This acetylene high polymer film was a p-type semiconductor having an electrical conductivity of $2.5 \times 10^{-8} \Omega^{-1}$ cm$^{-1}$. The bulk density of the film was 0.52 g/cc. When the film was observed by an electron microscope, it was found that the film had a porous structure in which fibrils were randomly entangled with one another.

[Doping Test]

The doping test of the porous acetylene high polymer film having a bulk density of 0.52 g/cc, which was obtained according to the above-mentioned method, was carried out under the same doping conditions as adopted in Example 1, except that the doping time was changed to 8.9 hours. An electrically conductive acetylene high polymer film was obtained having a composition of $[CH(ClO_4)_{0.060}]_x$, which was used as a p-type semiconductor having an electrical conductivity of 290 $\Omega^{-1}$.cm$^{-1}$.

[Discharge Test of Battery]

By using the electrically conductive acetylene high polymer film obtained according to the above-mentioned method, the battery discharge test was carried out in the same manner as described in Example 1. The obtained results are shown in Table 2.

When the results shown in Table 1 are compared with the results shown in Table 2, it will readily be understood that in the case of a battery comprising a non-porous acetylene high polymer having a high bulk density, discharge can be continued for a much longer time and the energy density is remarkably enhanced.

TABLE 2

| Discharge Time (minutes) | Isc (mA) | Voc (V) |
|---|---|---|
| 0 | 12.4 | 3.68 |
| 1 | 5.2 | 3.50 |
| 2 | 0.8 | 3.55 |
| 3 | 0.0 | 3.29 |

[Repeated Charging-Discharging Test of Battery]

The repeated charging-discharging test of a battery was carried out in the same manner as described in Example 1, except that the porous acetylene high polymer having a bulk density of 0.52 g/cc, which was obtained according to the above-mentioned method, was used and the charging time was changed to 2.5 hours (the quantity of electric charge corresponding to a doping amount of 9 mole %). When the test was repeated 281 times, charging became impossible. Accordingly, the acetylene high polymer was taken out and checked. It was found that the film was broken. When a part of the broken film was analyzed by elementary analysis and infrared spectrophotometric analysis, it was found that the polymer was drastically oxidized and deteriorated.

The energy density was 350 W.hr per Kg of the acetylene high polymer used, and the charging-discharging efficiency was 53%. The ratio of the quantity of the electric charge discharged until the voltage was reduced to 3 V to the total quantity of the electric charge discharged was 66%.

COMPARATIVE EXAMPLE 2

The repeated charging-discharging test was carried out in the same manner as described in Example 2, except that the porous acetylene high polymer having a bulk density of 0.52 g/cc, which was obtained in Comparative Example 1, was used instead of the non-porous acetylene high polymer having a bulk density of 1.05 g/cc, which was used in Example 2, and the doping time was changed to 5 hours (the quantity of electric charge corresponding to a doping quantity of 18 mole %). When the test was repeated 67 times, charging became impossible. Accordingly, the acetylene high polymer was taken out and checked. It was found that the film was broken. When a part of the broken film was analyzed by elementary analysis and infrared spectrophotometric analysis, it was found that the film was drastically oxidized and deteriorated.

The energy density was 480 W.hr per Kg of the acetylene high polymer used, and the charging-discharging efficiency was 36%. The ratio of the quantity of the electric charge discharged until the voltage was reduced to 3 V to the total quantity of electric charge discharged was 59%.

EXAMPLE 3

[Preparation of an Acetylene High Polymer Having a High Bulk Density]

The sheet-like swollen acetylene high polymer obtained in Example 1 was inserted between chromium-plated terrotype stainless steel plates and pre-press-molded at room temperature under a pressure of 100 Kg/cm$^2$, and it was then press-molded under a pressure of 8 ton/cm$^2$ to obtain a uniform and flexible acetylene high polymer film having a reddish brown metallic luster, a thickness of 130 μm and a high mechanical strength. The film was dried in vacuo for 5 hours and the bulk density was measured. It was found that the bulk density was 0.91 g/cc. The film was a p-type semiconductor having an electrical conductivity of $3.9 \times 10^{-7} \Omega^{-1}$.cm$^{-1}$ at 20° C. When the film was observed by an electron microscope, it was confirmed that the film had a non-porous structure.

[Doping Test]

Two small specimens having a width of 0.5 cm and a length of 2.0 cm were taken as samples from the non-porous acetylene high polymer film having a high density, which was obtained according to the above-mentioned method, and they were mechanically press-bonded to different platinum wires. By using these acetylene high polymer films as a cathode and an anode and by using a tetrahydrofuran solution containing 0.5 mole/l of $(n-Bu_4N)^+(PF_6)^-$ as an electrolyte solution, doping was carried out under a constant voltage (1.0 V to an $Ag/Ag^+$ reference electrode) to obtain an electrically conductive acetylene high polymer film having a composition of $[CH(PF_6)_{0.060}]_x$ and an electrically conductive acetylene high polymer film having a composition of $[(n-Bu_4N)_{0.060}CH]_x$ on the respective electrodes. The former film was a p-type semiconductor having an electrical conductivity of $410\Omega^{-1}.cm^{-1}$ and the latter film was an n-type semiconductor having an electrical conductivity of $150\Omega^{-1}.cm^{-1}$.

[Discharge Test of Battery]

The electrically conductive acetylene high polymer films, $[CH(PF_6)_{0.060}]_x$ and $[(n-Bu_4N)_{0.060}CH]_x$, which were obtained according to the above-mentioned method, were mechanically press-bonded to platinum wires again as a cathode and an anode, and by using a tetrahydrofuran solution containing 0.5 mole/l of $(n-Bu_4N)^+(PF_6)^-$ as an electrolyte solution, the discharge test was carried out. The obtained results are shown in Table 3.

TABLE 3

| Discharge Time (minutes) | Isc (mA) | Voc (V) |
| --- | --- | --- |
| 0 | 9.0 | 3.41 |
| 1 | 8.8 | 3.38 |
| 2 | 6.2 | 3.40 |
| 3 | 5.9 | 3.56 |
| 4 | 5.5 | 3.40 |
| 5 | 5.0 | 3.35 |
| 10 | 4.0 | 3.21 |
| 20 | 3.3 | 3.19 |
| 30 | 2.9 | 3.18 |
| 40 | 1.5 | 3.10 |

[Repeated Charging-Discharging Test of a Battery]

Two small specimens having a width of 0.5 cm and a length of 2.0 cm were prepared from the acetylene high polymer having a thickness of 130 μm and a bulk density of 0.91 g/cc, which was obtained according to the above-mentioned method, and they were mechanically press-bonded to different platinum wires as a cathode and an anode. By using a tetrahydrofuran solution containing 0.5 mole/l of $(Bu_4N)^+(PF_6)^-$ as an electrolyte solution, charging was carried out under a constant current density (0.5 mA/cm$^2$) for 5 hours (the quantity of electric charge corresponding to a doping quantity of 9 mole %), and after completion of the charging, discharging was immediately started under a constant current density (0.5 mA/cm$^2$). When the voltage became 1 V, charging was conducted again under the above-mentioned conditions. Thus, the repeated charging and discharging test was conducted 100 times. The discharge voltage characteristics were not changed at all, even after the above test.

The energy density was 270 W.hr per Kg of the acetylene polymer used and the charging-discharging efficiency was 80%. The ratio of the quantity of electric charge discharged until the voltage was reduced to 1.5 V to the total quantity of electric charge discharged was 86%.

[Self-Discharge Test of Battery]

In the above-mentioned repeated charging-discharging test, after the first charging operation was completed, the battery system was allowed to stand still for 100 hours, and the charging test was conducted again. The energy density was 250 W.hr per Kg of the acetylene high polymer used. The self-discharge ratio of this battery was 7.4%.

COMPARATIVE EXAMPLE 3

The doping test was carried out in the same manner as described in Example 3 except that the porous acetylene high polymer having a low density, which was obtained in Comparative Example 1, was used instead of the non-porous acetylene high polymer having a high bulk density, which was used in Example 3. Then, the battery discharge test was carried out in the same manner as described in Example 3. The obtained results are shown in Table 4.

TABLE 4

| Discharge Time (minutes) | Isc (mA) | Voc (V) |
| --- | --- | --- |
| 0 | 8.1 | 3.30 |
| 1 | 4.2 | 3.25 |
| 2 | 2.1 | 3.20 |
| 3 | 0.0 | 3.15 |

[Repeated Charging-Discharging Test]

The repeated charging-discharging test was carried out in the same manner as described in Example 3 except that the porous acetylene high polymer having a thickness of 90 μm and a bulk density of 0.52 g/cc, which was obtained in Comparative Example 1, was used instead of the non-porous acetylene high polymer having a thickness of 130 μm and a bulk density of 0.91 g/cc, which was used in Example 3, and the charging time was changed to 2.5 hours (the quantity of electric charge corresponding to a doping quantity of 9 mole %). When the test was repeated 23 times, charging became impossible. Accordingly, the acetylene high polymer was taken out and checked. It was found that the film of the acetylene high polymer of the cathode was broken.

The energy density was 220 W.hr per Kg of the acetylene high polymer used, and the charging-discharging efficiency was 66%. The ratio of the quantity of the electric charge discharged until the voltage was reduced to 1.5 V to the total quantity of the electric charge discharged was 69%.

[Self-Discharge Test of Battery]

In the above-mentioned repeated battery charging-discharging test, after the first charging operation was completed, the battery was allowed to stand still for 100 hours. Then, the battery was subjected to the discharge test. The energy density was 93 W hr per Kg of the acetylene high polymer used. The self-discharge ratio of the battery was 58%.

EXAMPLE 4

[Preparation of an Acetylene High Polymer Having a High Density]

Acetylene was polymerized in the same manner as described in Example 1, except that acetylene gas was blown while the catalyst solution was being stirred, not while being kept in a stationary state, and the polymerization reaction was conducted for 24 hours while maintaining the acetylene gas pressure at one atmosphere. The formed acetylene polymer solution was washed with purified toluene. Even after washing, the polymer solution was slightly brownish, and it was found that the catalyst was not completely removed. The gel-like acetylene polymer swollen in toluene was in the form of a uniform chip in which fibrous microcrystals were regularly entangled with one another, and a powdery or bulky polymer was not formed.

A part of the so-obtained homogeneous gel-like product was taken as a sample and dried, and the content of the acetylene high polymer in the gel-like product was measured. It was found that the acetylene high polymer content in the gel-like product was 10% by weight.

The gel-like product was charged in a mold having a thickness of 1 mm, a length of 100 mm and a width of 50 mm and sandwiched between chromium-plated ferro-type stainless steel plates. Thus, the gel-like product was press-molded under a pressure of 100 Kg/cm$^2$, while removing toluene therefrom, to obtain a tough molded article of a film form which was non-porous and had a thickness of 500 μm and a bulk density of 1.0 g/cc. This film was a p-type semiconductor having an electrical conductivity of $5 \times 10^{-8} \Omega^{-1}.cm^{-1}$, as determined according to the direct current four-terminal method.

[Repeated Charging-Discharging Test]

The repeated charging-discharging test was carried out in the same manner as described in Example 1 except that the acetylene high polymer having a thickness of 500 μm and a density of 1.0 g/cc, which was obtained according to the above-mentioned method, was used instead of the acetylene high polymer having a thickness of 120 μm and a bulk density of 1.05 g/cc, which was used in Example 1, and the charging time was changed to 20 hours (corresponding to a doping quantity of 9 mole %). Even after the test was repeated 500 times, the discharge voltage characteristics were not different from the initial discharge voltage characteristics at all.

The energy density was 660 W.hr per Kg of the acetylene high polymer used, and the charging-discharging efficiency was 94%. The ratio of the quantity of the electric charge discharged until the voltage was reduced to 3 V to the total quantity of the electric charge discharged was 95%.

EXAMPLES 5 through 8

The repeated charging-discharging test was carried out in the same manner as described in Example 3 except that a compound, shown in Table 5, was used as the supporting electrolyte instead of $(Bu_4N)^+(PF_6)^-$ used in Example 3. The obtained results are shown in Table 5.

TABLE 5

| Example No. | Supporting Electrolyte | Energy Density (W · hr per Kg of polymer) | Charging-Discharging Efficiency (%) |
|---|---|---|---|
| 5 | $(C_6H_5)_3^+.BF_4^-$ | 314 | 93 |
| 6 | 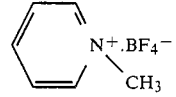 | 304 | 90 |
| 7 | 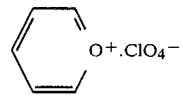 | 300 | 89 |
| 8 | $\underset{\underset{O}{\parallel}}{H-C^+.BF_4^-}$ | 311 | 92 |

EXAMPLE 9

In the same manner as described in Example 1, a cathode was prepared from an acetylene high polymer film having a thickness of 120 μm and a bulk density of 1.05 g/cc, which was obtained according to the method described in Example 1. Metallic lithium was used as an anode and a propylene carbonate solution containing 0.3 mole/l of $Li.HF_2$ was used as an electrolyte solution, and charging (doping) was carried out under a constant electric current (1.0 mA) for 3 hours. The doped acetylene high polymer film had a golden metallic luster and, from the results of the elementary analysis, it was confirmed that the film had a composition of $[CH(HF_2)_{0.11}]_x$. The film was a p-type semiconductor having an electric conductivity of $1,020 \Omega^{-1}.cm^{-1}$, as determined according to the direct-current four-terminal method.

[Discharge Test of Battery]

The discharge test was carried out by using the battery charged according to the above-mentioned method, and the open circuit voltage (Voc) and short circuit current (Isc) were measured at predetermined intervals. The obtained results are shown in Table 6. From these results, it was found that the energy density of this battery was 510 W hr per Kg of the electrode weight (the sum of the weight of the doped acetylene high polymer and the weight of consumed metallic lithium).

TABLE 6

| Discharge Time (minutes) | Isc (mA) | Voc (V) |
|---|---|---|
| 0 | 30.5 | 4.10 |
| 1 | 26.4 | 3.70 |
| 2 | 20.5 | 3.70 |
| 3 | 18.0 | 3.72 |
| 4 | 16.7 | 3.68 |
| 5 | 15.3 | 3.70 |
| 10 | 14.0 | 3.65 |
| 20 | 7.7 | 3.63 |
| 30 | 6.3 | 3.61 |
| 40 | 5.1 | 3.63 |
| 50 | 3.0 | 3.62 |
| 60 | 1.8 | 3.57 |

EXAMPLE 10

[Acetylene High Polymer]

The acetylene high polymer having a density of 1.05 g/cc, obtained in Example 1, was used.

[Charging (Doping) Test of Battery]

Two small specimens having a width of 0.5 cm and a length of 2.0 cm were prepared from the above acetylene high polymer (having a thickness of 120 μm), and they were mechanically press-bonded to platinum wires as a cathode and an anode. By using as an electrolyte solution a propylene carbonate solution containing 0.3 mole/l of $NH_4.HF_2$ as a supporting electrolyte, doping was carried out under a constant electric current of 1.0 mA for 2 hours. From the results of the composition analysis, it was found that the acetylene high polymer as the cathode had a composition of $[(CH)(HF_2^-)_{0.070}]_x$ and the acetylene high polymer as the anode had a composition of $[(CH)(NH_4^-)_{0.070}]_x$. The electric conductivities of the cathode and anode were $420\Omega^{-1}.cm^{-1}$ and $295\Omega^{-1}.cm^{-1}$, respectively.

[Discharge Test of Battery]

The discharge test of the battery charged according to the above-mentioned test, was carried out in the same manner as described in Example 6.

At the time of discharge, the initial Voc value was 2.7 V, the initial Isc value was 21.1 mA, and the energy density was 326 W hr per Kg of the electrode weight.

COMPARATIVE EXAMPLE 4

[Acetylene High Polymer]

The acetylene high polymer prepared in Comparative Example 1 was used.

[Doping Test]

A small specimen having a width of 0.5 cm and a length of 2.0 cm was prepared from the above-mentioned acetylene high polymer, and it was mechanically press-bonded to a platinum wire and used as an anode. By using a platinum plate as a cathode and a propylene carbonate solution containing 0.3 mole/l of $NH_4.HF_2$ as an electrolyte solution, doping was carried out under a constant electric current (1.0 mA) for 5 hours. After completion of the doping operation, the doped acetylene high polymer was washed with propylene carbonate repeatedly to obtain a doped acetylene polymer having a golden metallic luster. From the results of the elementary analysis, it was found that the doped acetylene high polymer film had a composition of $[CH(HF_2)_{0.181}]_x$. The electric conductivity of the film was $1,540\Omega^{-1}.cm^{-1}$, as determined according to the direct-current four-terminal method.

[Discharge Test of Battery]

A battery was assembled by using the $HF_2^-$-doped electrically conductive acetylene high polymer obtained according to the above method as a cathode active material and lithium as an anode-active material.

FIG. 1 is a sectional diagram illustrating a battery cell for measuring the characteristics of a button type battery, according to one embodiment of the present invention.

In FIG. 1, reference numeral 1 represents an Ni-plated brass vessel, reference numeral 2 represents a disc-like lithium negative electrode having a diameter of 20 mm, reference numeral 3 represents a circular porous polypropylene separator having a diameter of 26 mm, reference numeral 4 represents a circular felt of carbon fibers having a diameter of 26 mm, reference numeral 5 represents a cathode, reference numeral 6 represents a Teflon sheet with pores having an average diameter of 2 μm (Fluoropore FP-200 supplied by Sumitomo Denko), reference numeral 7' represents a cylindrical Teflon vessel, reference numeral 7 represents a push rod fitted in the vessel 7', reference numeral 8 represents a cathode fixing Teflon ring, and reference numeral 9 represents an Ni lead line.

The cathode ($HF_2^-$-doped electrically conductive acetylene high polymer) was placed at a concave part in the lower portion of the vessel 1, and the circular porous Teflon sheet 6 was placed on the cathode. The sheet 6 and the cathode were clamped and fixed by the Teflon ring 8. The felt 4 was placed at a concave part in the upper portion of the vessel 1, piled on the cathode and impregnated with the electrolyte solution. Then, the lithium anode 2 was placed on the felt 4 through the separator 3 and clamped by the vessel 7. Thus, a battery was assembled. As the electrolyte solution, there was employed a solution obtained by dissolving $LiClO_4$ at a concentration of 1 mole/l in distilled and dehydrated propylene carbonate.

The open-circuit voltage of the thus assembled battery was 3.7 V.

Figure 2:
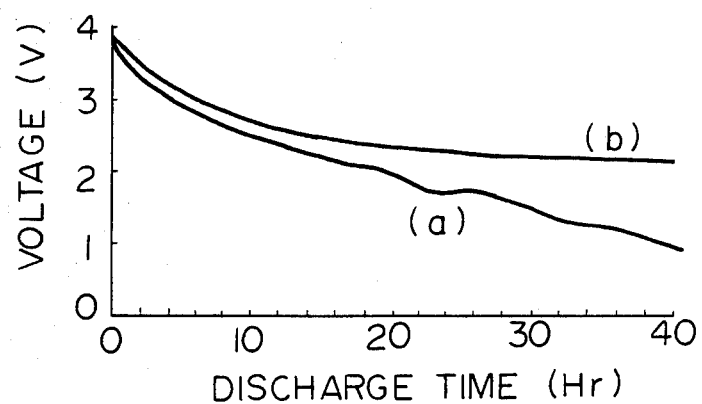
FIGS. 2 and 3 are discharge curves illustrating the relations between the discharge time and the voltage, which are observed in primary batteries according to the present invention and in primary batteries of comparative examples.

The discharge test of this battery was carried out under a constant current of 0.3 mA in an argon atmosphere. The relation between the discharge time and the voltage, which was observed at this discharge test, is shown by Curve (a) in FIG. 2.

EXAMPLE 11

[Acetylene High Polymer]

The acetylene high polymer prepared in Example 1 was used.

[Doping Test]

A small specimen having a width of 0.5 cm and a length of 2.0 cm was prepared from the above-mentioned acetylene high polymer having a bulk density of 1.05 g/cc and was mechanically press-bonded to a platinum wire and used as an anode. By using a platinum plate as a cathode and a propylene carbonate solution containing 0.3 mole/l of $NH_4.HF_2$ as an electrolyte solution, doping was carried out under a constant current (1.0 mA) for 10 hours. After completion of the doping operation, the doped acetylene high polymer film was washed with propylene carbonate repeatedly to obtain a doped acetylene high polymer having a golden metallic luster. From the results of the elementary analysis, it was found that the doped acetylene high polymer film had a composition of $[CH(HF_2)_{0.189}]_x$. The electric conductivity of the film was $2,540\Omega^{-1}.cm^{-1}$, as determined according to the direct-current four-terminal method.

[Discharge Test of Battery]

The battery discharge test was carried out in the same manner as described in Comparative Example 4 except that the electrically conductive acetylene high polymer having a composition of $[CH(HF_2)_{0.189}]_x$, which was obtained according to the above-mentioned method, was used as the cathode-active material. The obtained results are indicated by Curve (b) in FIG. 2. The initial open-circuit voltage of the battery was 3.7 V.

EXAMPLE 12

[Acetylene High Polymer]

The acetylene high polymer prepared in Example 1 was used.

[Doping Test]

A small specimen having a width of 0.5 cm and a length of 2.0 cm was prepared from the above-mentioned acetylene high polymer having a bulk density of 1.05 g/cc and was mechanically press-bonded to a platinum wire and used as an anode. By using a platinum plate as a cathode and a propylene carbonate solution containing 0.3 mole/l of $LiPF_6$ as an electrolyte solution, doping was carried out under a constant electric current (1.0 mA) for 10 hours. After completion of the doping operation, the doped acetylene high polymer was washed with propylene carbonate repeatedly to obtain a doped acetylene high polymer having a golden metallic luster. From the results of the elementary analysis, it was found that the doped acetylene high polymer film had a composition of $[CH(PF_6)_{0.189}]_x$. The electric conductivity of the film was $2,540 \Omega^{-1} \cdot cm^{-1}$, as determined according to the direct-current four-terminal method.

[Discharge Test of Battery]

A battery was assembled in the same manner as described in Comparative Example 4, except that the electrically conductive acetylene high polymer having a composition of $[CH(PF_6)_{0.189}]_x$, which was obtained according to the above-mentioned method, was used as the cathode-active material and lithium was used as the anode-active material.

Figure 3:
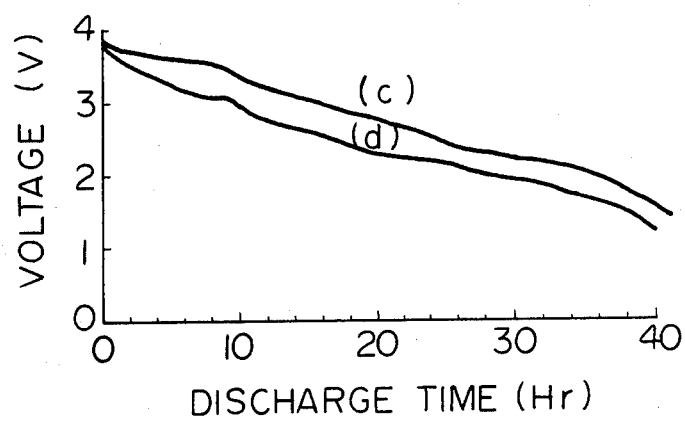

The open-circuit voltage of the thus assembled battery was 3.9 V. The discharge test of the battery was carried out under a constant current of 0.5 mA in argon. The relation between the discharge time and the voltage, as indicated by Curve (c) in FIG. 3, was observed.

COMPARATIVE EXAMPLE 5

[Acetylene High Polymer]

The acetylene high polymer prepared in Comparative Example 1 was used.

[Doping Test]

A small specimen having a width of 0.5 cm and a length of 2.0 cm was prepared from the above-mentioned acetylene high polymer having a bulk density of 0.52 g/cc and was mechanically press-bonded to a platinum wire and used as an anode. By using a platinum plate as a cathode and a propylene carbonate solution containing 0.3 mole/l of $LiPF_6$ as an electrolyte solution, doping was carried out under a constant current of 1.0 mmA for 5 hours. After completion of the doping operation, the doped acetylene high polymer film was washed with propylene carbonate repeatedly to obtain a doped acetylene high polymer having a golden metallic luster. From the results of the elementary analysis, it was found that the doped acetylene high polymer film had a composition of $[CH(PF_6)_{0.192}]_x$. The electric conductivity of the film was $820 \Omega^{-1} \cdot cm^{-1}$, as determined according to the direct-current four-terminal method.

[Discharge Test of Battery]

The battery discharge test was carried out in the same manner as described in Example 12, except that the electrically conductive acetylene high polymer obtained by doping $PF_6^-$ in the acetylene high polymer having a bulk density of 0.52 g/cc according to the above-mentioned method was used as the cathode-active material, instead of the electrically conductive acetylene high polymer obtained by doping $PF_6^-$ into the acetylene high polymer having a bulk density of 1.05 g/cc, which was used in Example 12. The relation between the discharge time and the voltage, as indicated by Curve (d) in FIG. 3, was observed. The initial open-circuit voltage of the battery was 3.7 V.

We claim:

1. A battery comprising anode means, cathode means and an electrolyte, wherein the electrolyte comprises a compound capable of being ionized into at least one dopant selected from the group consisting of anion dopants and cation dopants and at least one of said anode means and said cathode means comprises, as its electrode-active material, an acetylene high polymer shaped article having a fibrous microcrystalline structure and a bulk density of 0.7 to 1.2 g/cc, which is prepared by shaping under pressure an acetylene high polymer swollen with an inert organic solvent and which is dopable to a more highly oxidized state by said anion dopant, or an electron-accepting compound consisting of the molecule of said anion or dopable to a more lowly oxidized state by said cation dopant, or an electron-donating compound consisting of the molecule of said cation.

2. A battery as set forth in claim 1, wherein the battery is a primary battery and the acetylene high polymer is doped with said dopant, so that the electrical conductivity of the resulting electrically conductive acetylene high polymer is at least $10^{-4} \Omega^{-1} \cdot cm^{-1}$.

3. A battery as set forth in claim 1, wherein the battery is a primary battery and the acetylene high polymer is doped with said dopant, so that the electrical conductivity of the resulting electrically conductive acetylene high polymer is at least $0.1 \Omega^{-1} \cdot cm^{-1}$.

4. A battery as set forth in claim 1, wherein the battery is a secondary battery, at least one of said anode means and said cathode means comprises, as an electrode-active material, the acetylene high polymer which is dopable to a more highly oxidized state by said anion dopant and to a more lowly oxidized state by said cation dopant, and the electrical conductivity of the thus doped electrically conductive acetylene high polymer is in the range of from $10^{-9}$ to $10^{-4} \Omega^{-1} \cdot cm^{-1}$.

5. A battery as set forth in claim 1, wherein the battery is a secondary battery, at least one of said anode means and said cathode means comprises, as an electrode-active material, the acetylene high polymer which is dopable to a more highly oxidized state by said anion dopant and to a more lowly oxidized state by said cation dopant, and the electrical conductivity of the thus doped electrically conductive acetylene high polymer is at least $10^{-4} \Omega^{-1} \cdot cm^{-1}$.

6. A battery as set forth in claim 1, wherein the anion dopant is selected from the group consisting of an anion of a halide of an element of the group VA of the Periodic Table, an anion of a halide of an element of the group IIIA of the Periodic Table, a halogen anion, a perhalo-acid anion and an organic anion.

7. A battery as set forth in claim 1 or 2, wherein the anion dopant is selected from the group consisting of $PF_6^-$, $SbF_6^-$, $AsF_6^-$, $SbCl_6^-$, $SiF_6^{--}$, $BF_4^-$, $BCl_4^-$, $AlCl_4^-$, $I^-$ or $I_3^-$, $Br^-$, $Cl^-$, $NO_3^-$, $POF_4^-$, $CN^-$, $ClO_4^-$, $IO_4^-$, $CF_3SO_3^-$, $CH_3CO_2^-$, $CF_3CO_2^-$, $C_6H_5CO_2^-$ $C_6H_5CO_2^-$ and $CH_3C_6H_4SO_3^-$.

8. A battery as set forth in claim 1, wherein the cation dopant is selected from the group consisting of an alkali metal ion and an organic cation which is selected from the group consisting of $R_{4-x}M_x^+$ and $R_3E^+$, wherein R is alkyl or aryl, M is N, P or AS, E is 0 or S, and X is an integer ranging from 0 to 4.

9. A battery as set forth in claim 1, wherein the anion dopant is $HF_2^-$.

10. A battery as set forth in claim 1, wherein the cation dopant is selected from the group consisting of pyrylium and pyridinium cations represented by the following formula (I):

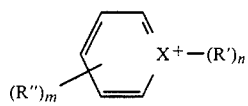

wherein X stands for an oxygen atom or nitrogen atom, R' stands for a hydrogen atom, an alkyl group having 1 to 20 carbon atoms or an aryl group having 6 to 20 carbon atoms, R" stands for a halogen atom, an alkyl group having 1 to 10 carbon atoms or an aryl group having 6 to 20 carbon atoms, n is zero when X is an oxygen atom or n is 1 when X is a nitrogen atom, and m is an integer of from 0 to 5; and carbonium catrons represented by the following formulae (II) and (III):

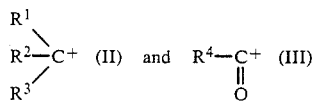

wherein $R^1$, $R^2$ and $R^3$ stand for a hydrogen atom, an alkyl group having 1 to 15 carbon atoms, an allyl group, an aryl group having 6 to 20 carbon atoms or a group $-OR^5$, in which $R^5$ stands for an alkyl group having 1 to 10 carbon atoms or an aryl group having 6 to 20 carbon atoms, with the proviso that the case where all of $R^1$, $R^2$ and $R^3$ are hydrogen atoms is excluded, and $R^4$ stands for a hydrogen atom, an alkyl group having 1 to 15 carbon atoms or an aryl group having 6 to 20 carbon atoms.

11. A battery as set forth in any of claims 1, 2 and 9, wherein the electrode-active material of said cathode means is the acetylene high polymer doped with $HF_2^-$ and the electrode-active material of said anode means is a metal having a Pauling electronegativity value not exceeding 1.6.

12. A battery as set forth in claim 11, wherein the metal having a Pauling electronegativity value of not exceeding 1.6 is lithium or aluminum.

13. A battery comprising anode means, cathode means and an electrolyte, wherein the electrolyte comprises a compound capable of being ionized into at least one dopant selected from the group consisting of anion dopants and cation dopants and at least one of said anode means and said cathode means comprises, as its electrode-active material, an acetylene high polymer having a fibrous microcrystalline (fibril) structure and a bulk density of 0.7 to 1.2 g/cc, which is dopable to a more highly oxidized state by said anion dopant, or an electron-accepting compound consisting of the molecule of said anion or dopable to a more lowly oxidized state by said cation dopant, or an electron-donating compound consisting of the molecule of said cation, and wherein said anion dopant is $HF_2^-$.

14. A battery as set forth in claim 13, wherein the electrode-active material of said cathode means is the acetylene high polymer doped with $HF_2^-$ and the electrode-active material of said anode means is a metal having a Pauling electronegativity value not exceeding 1.6.

15. A battery as set forth in claim 14, wherein the metal having a Pauling electronegativity value of not exceeding 1.6 is lithium or aluminum.

16. A battery comprising anode means, cathode means and an electrolyte, wherein the electrolyte comprises a compound capable of being ionized into at least one dopant selected from the group consisting of anion dopants and cation dopants and least one of said anode means and said cathode means comprises, as its electrode-active material, an acetylene high polymer having a fibrous microcrystalline (fibril) structure and a bulk density of 0.7 to 1.2 g/cc, which is dopable to a more highly oxidized state by said anion dopant, or an electron-accepting compound consisting of the molecule of said anion or dopable to a more lowly oxidized state by said cation dopant, or an electron-donating compound consisting of the molecule of said cation, and wherein said cation dopant is selected from the group consisting of pyrylium and pyridinium cations represented by the following formula (I):

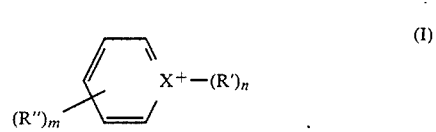

wherein X stands for an oxygen atom or nitrogen atom, R' stands for a hydrogen atom, an alkyl group having 1 to 20 carbon atoms or an aryl group having 6 to 20 carbon atoms, R" stands for a halogen atom, an alkyl group having 1 to 10 carbon atoms or an aryl group having 6 to 20 carbon atoms, n is zero when X is an oxygen atom or n is 1 when X is a nitrogen atom, and m is an integer of from 0 to 5; and carbonium cations represented by the following formula (II) and (III):

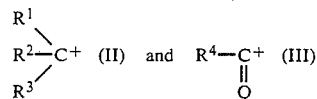

wherein $R^1$, $R^2$, and $R^3$ stand for a hydrogen atom, an alkyl group having 1 to 15 carbon atoms, an allyl group, an aryl group having 6 to 20 carbon atoms or a group $-OR^5$, in which $R^5$ stands for an alkyl group having 1 to 10 carbon atoms or an aryl group having 6 to 20 carbon atoms, with the proviso that the case where all of $R^1$, $R^2$ and $R^3$ are hydrogen atoms is excluded, and $R^4$ stands for a hydrogen atom, an alkyl group having 1 to 15 carbon atoms or an aryl group having 6 to 20 carbon atoms.

* * * * *

UNITED STATES PATENT AND TRADEMARK OFFICE
CERTIFICATE OF CORRECTION

PATENT NO. : 4,496,640
DATED : January 29, 1985
INVENTOR(S) : Yukio KOBAYASHI, et al.

It is certified that error appears in the above—identified patent and that said Letters Patent is hereby corrected as shown below:

Column 2, line 4, "electrodonating" should be deleted.

Column 21, line 20, "$(NH_4^-)0.070]_x.$" should be --$(NH_4^+)0.070]_x.$--.

Column 24, line 24, after "microcrystalline", --fibril-- should be inserted.

Column 25, line 32, "catrons" should be --cations--.

Signed and Sealed this

Twelfth Day of August 1986

[SEAL]

Attest:

DONALD J. QUIGG

Attesting Officer

Commissioner of Patents and Trademarks